United States Patent [19]

Seale et al.

[11] 4,299,531
[45] Nov. 10, 1981

[54] CARRIAGE FOR SUPPORTING A TUBE BUNDLE ON A TUBE BUNDLE PULLER

[75] Inventors: James B. Seale; Henry Gusse, both of Edmonton, Canada

[73] Assignee: Edmonton Exchanger and Refinery Services Ltd., Edmonton, Canada

[21] Appl. No.: 112,015

[22] Filed: Jan. 14, 1980

[30] Foreign Application Priority Data

Jun. 22, 1979 [CA] Canada ................... 330407

[51] Int. Cl.³ ............................................. B23P 15/26
[52] U.S. Cl. ................................. 414/746; 29/726; 269/296; 410/49; 414/910
[58] Field of Search ............. 414/745, 746, 747, 910; 410/47, 49, 50; 280/414 R; 29/244, 726; 269/296, 299, 902; 211/60 R; 248/139, 671

[56] References Cited

U.S. PATENT DOCUMENTS

| | | | |
|---|---|---|---|
| 2,680,287 | 6/1954 | Wilson | 414/745 X |
| 2,701,976 | 2/1955 | Krause | |
| 3,091,900 | 6/1963 | Whittenberg | |
| 3,180,498 | 4/1965 | Postlewaite | 414/746 |
| 3,567,044 | 3/1971 | Travis | 414/746 |
| 3,922,004 | 11/1975 | Chamberlain | 410/49 |
| 3,956,810 | 5/1976 | Chapman | |
| 3,958,698 | 5/1976 | van der Woerd | 414/746 |
| 4,227,854 | 10/1980 | Coffey | 414/746 |
| 4,234,174 | 11/1980 | Cardono | 269/152 X |

FOREIGN PATENT DOCUMENTS

| | | |
|---|---|---|
| 155312 | 4/1914 | Canada |
| 162206 | 4/1915 | Canada |
| 316436 | 6/1931 | Canada |
| 649031 | 9/1962 | Canada |
| 835790 | 3/1970 | Canada |
| 923917 | 4/1973 | Canada |

Primary Examiner—Leslie J. Paperner
Attorney, Agent, or Firm—Beveridge, DeGrandi, Kline & Lunsford

[57] ABSTRACT

A carriage comprises a frame having load-bearing and guide rollers to enable it to roll longitudinally of a tube bundle puller while supporting a tube bundle. On each of two sides of the frame the carriage has two links which are commonly pivoted at one end and at their other ends are provided with members engaged by an elongate bolt rotation of which causes the members to move towards or away from one another. The carriage permits tube bundles of various diameter to be supported directly or indirectly by the members at a proper height.

8 Claims, 4 Drawing Figures

CARRIAGE FOR SUPPORTING A TUBE BUNDLE ON A TUBE BUNDLE PULLER

This invention relates to a carriage for supporting a tube bundle on a tube bundle puller.

It is periodically necessary to remove cylindrically arranged bundles of tubes from the cylindrical shells of heat exchanger in which the tube bundles are normally received, for example for cleaning or repair. Tube bundle pullers are known for this purpose, one such tube bundle puller being described in Travis U.S. Pat. No. 3,567,044 issued Mar. 2, 1971.

A tube bundle puller includes an elongate frame which includes elongate parallel beams spaced apart from one another, which can be positioned in longitudinal alignment with and below the axis of a tube bundle to be removed from its shell. The frame is supported by appropriate means and its end nearest to the shell is clamped to the shell. A drawhead which is movable along the length of the frame is clamped to a so-called tube sheet, which is a circular member to which all of the tubes of the tube bundle are attached, and the drawhead is moved along the frame to pull the tube bundle from the shell. For example, the drawhead includes a hydraulic actuator secured between the drawhead and the tube sheet, which actuator is retracted, while the drawhead is prevented from moving along the frame for example by engagement with blocks spaced along the lengths of the beams of the frame, to pull the tube bundle partly onto the frame, and is extended with the drawhead able to move so as to move the drawhead longitudinally along the frame away from the tube bundle. These operations are repeated to pull the tube bundle completely onto the frame, and the sequence can be reversed to return a tube bundle to its shell. Alternatively, the drawhead can be moved by rotation of a threaded rod extending longitudinally of the frame on which rod is provided a correspondingly threaded member attached to the drawhead.

The tube bundle is very heavy, and accordingly must be supported at points along its length as it is moved onto and carried by the frame. The tube sheet, and also circular baffles provided at points spaced along the length of the cylindrical tube bundle, provide convenient locations for providing such support. For providing the necessary support, U.S. Pat. No. 3,567,044 discloses movable roller means illustrated in FIGS. 6 and 7 and described at column 5, lines 1 to 26 of that Patent. This movable roller means includes rollers which are able to roll along the tops of the beams of the frame and which carry a support frame which in turn supports wedge-shaped load bearing blocks, one on each side of the tube bundle, which serve to support the tube bundle. A limited lateral movement of the load bearing blocks is provided by bolts in the support frame which bear against these blocks.

This known arrangement permits tube bundles having only a very limited range of diameters to be supported. In order to support tube bundles of smaller diameter than this limited range, as described in U.S. Pat. No. 3,567,044 it is necessary to provide additional and separate support blocks which are disposed between the wedge-shaped load bearing blocks and the tube bundle. Thus in this known arrangement it is a relatively complicated and difficult matter to provide support at the proper height relative to the frame of tube bundles of varied diameters.

An object of this invention is to provide a carriage for a tube bundle puller which overcomes or at least reduces this disadvantage of the known arrangement.

According to this invention there is provided a carriage for supporting a tube bundle on a tube bundle puller, comprising a frame; means for permitting said frame to move in a longitudinal direction along a tube bundle puller; and a pair of support means provided one on each of two sides of the frame, each support means comprising: a pivot carried by the frame and extending in said longitudinal direction; an elongate rotatable threaded member and a first support member and a second member thereon; a first link member extending between and pivotally connected to each of said pivot and said first support member; and means pivotally coupling said second member to said frame; at least one of said first support member and said second member engaging said threaded member so that rotation of said threaded member causes movement of said first support member towards or away from said second member with consequent pivotal movement of said first link member relative to said second member about said pivot.

In a preferred embodiment of the invention which is described below, in each of the support means the second member constitutes a second support member and the pivotally coupling means comprises a second link member extending between and pivotally connected to each of said pivot and said second support member. Alternatively, however, each second member could be pivotally connected directly to the frame.

Each of said first and second link members of each support means conveniently comprises two links spaced apart from one another and means rigidly securing said links together with the respective support member therebetween, each link being pivotally connected to one end to said pivot and at the other end to the respective support member.

Preferably the means for permitting the frame to move in said longitudinal direction comprises, on each side of the frame, two load-bearing rollers arranged for rolling in said longitudinal direction and having axes which are horizontal in use of the carriage and are spaced apart in said longitudinal direction, and two guide rollers arranged for rolling in said longitudinal direction and having axes which are substantially vertical in use of the carriage and are spaced apart in said longitudinal direction.

The invention will be further understood from the following description by way of example of an embodiment thereof with reference to the accompanying drawings, in which.

Figure 1:
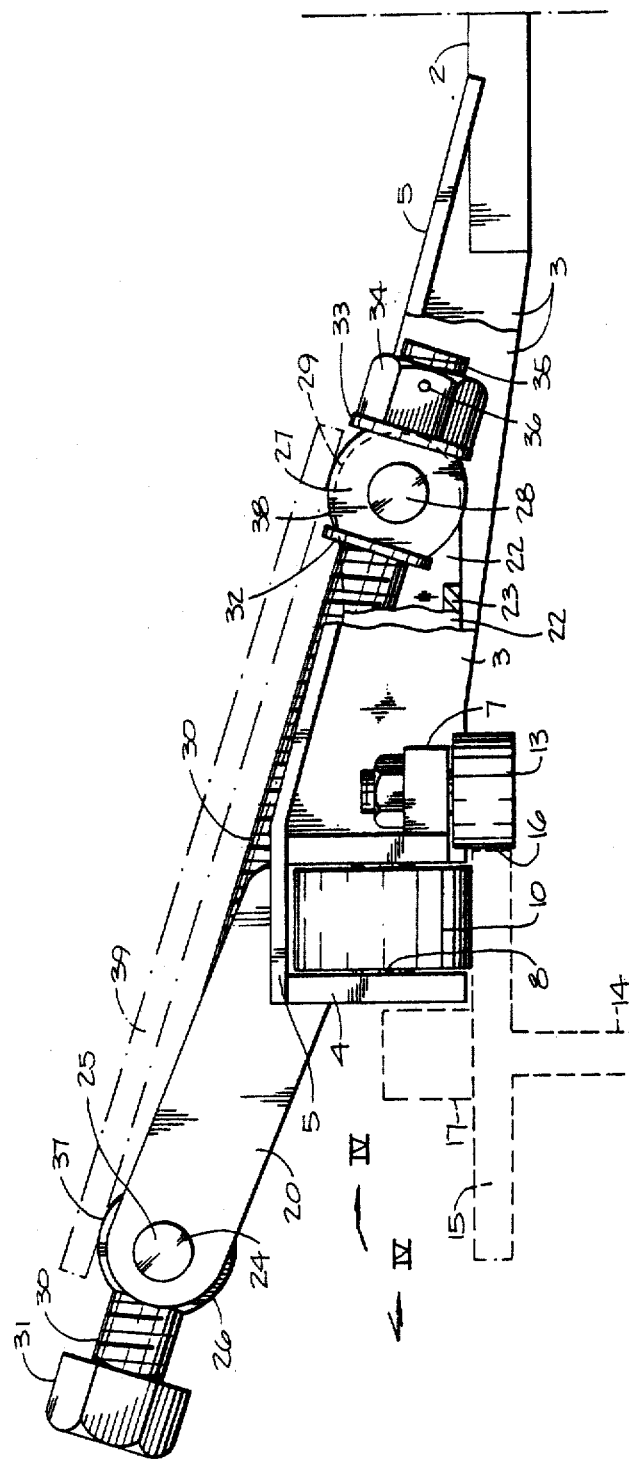
FIG. 1 shows a partly cut-away side elevation of one half of a carriage for a tube bundle puller.

The carriage described below and illustrated in the drawings is symmetrical about a center line 1 shown in FIGS. 1 and 2, and accordingly only one half of the carriage is shown in the drawings and described in detail below.

The carriage includes a frame consisting of a central member 2, laterally extending members 3, end members 4 only one of which is shown, top members 5, intermediate members 6 and roller support members 7, all rigidly secured together for example by welding.

Figure 4:
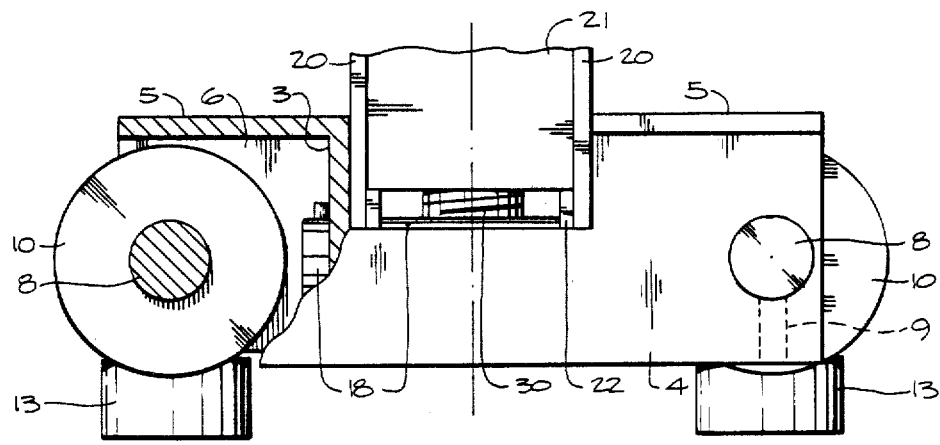
FIG. 4 is an end elevation of part of the carriage, taken in the direction of an arrow IV in FIG. 1.

The central member 2 extends transversely on each side of the center line 1, which is regarded as extending in a longitudinal direction determined by the length direction of a tube bundle puller on which the carriage is used. Generally, in use, the central member 2 is horizontal, whereas the members 3,4, and 6 are vertical. The members 3 extend parallel to and spaced from one another laterally or transversely from the central member 2 to the end member 4, which as shown in FIG. 4 is a generally U-shaped member extending in the longitudinal direction between and to each side of the members 3. The intermediate members 6 also extend in the longitudinal direction outwardly from the members 3 parallel to and spaced from the end member 4. The members 7 extend from the members 3 adjacent to the members 6 on the side thereof nearest to the center line 1. The top members 5 extend transversely to cover the upper edges of the members 3, 4, and 6.

Extending transversely between each leg of the U-shaped end member 4 and a respective one of the intermediate member members 6 there is provided an axle 8, which is secured in position by a screw (not shown) extending through a threaded bore 9 in the end member 4 as shown in dashed lines in FIG. 4, which carries a load-bearing roller 10 whose lower edge extends just below the lower edge of the end member 4. Depending from each roller support member 7, and supported by an axle 11 extending through the member 7 and having a threaded end engaged by a nut 12, is a guide roller 13.

Figure 2:
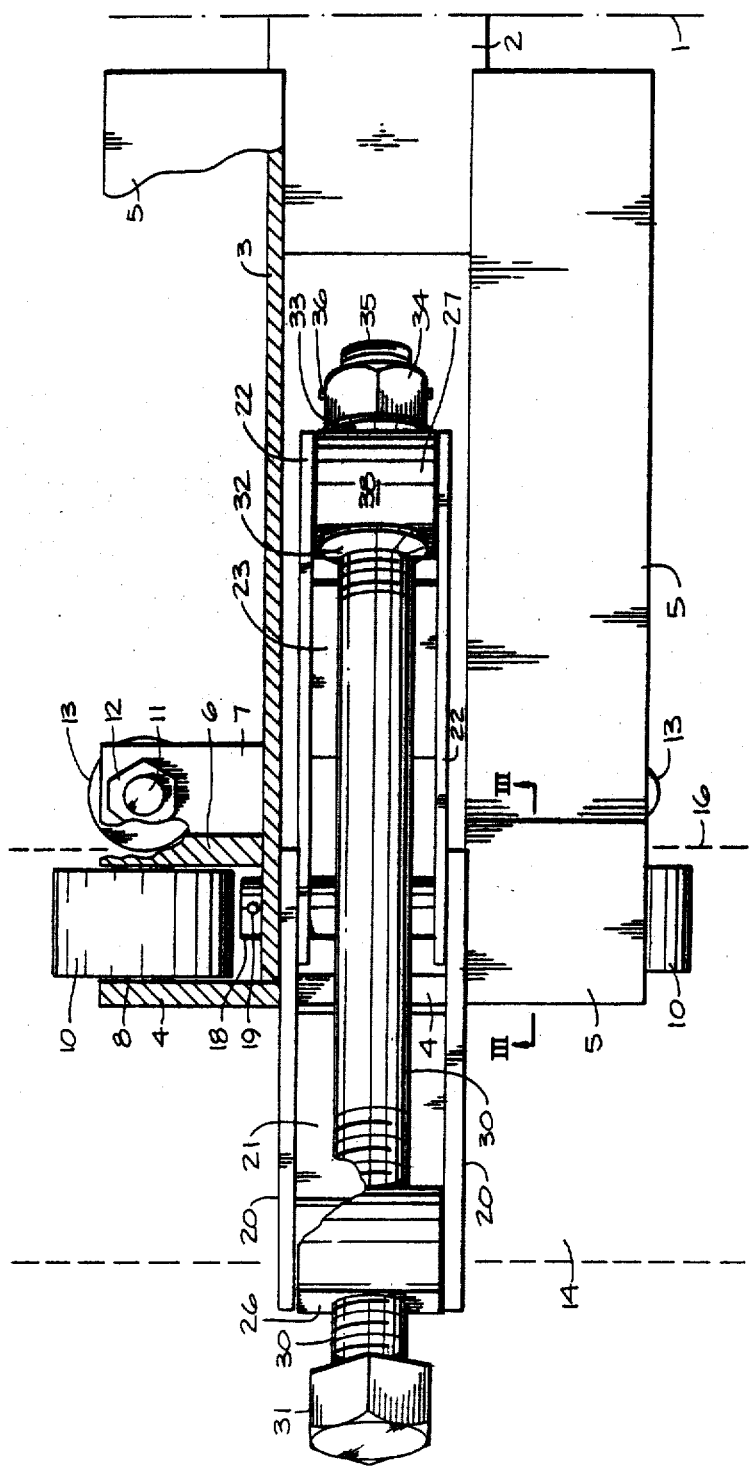
FIG. 2 shows a partly cut-away plan view of the half of the carriage shown in FIG. 1.

In use, the carriage is supported on two beams, part of one of which is shown as an I-beam 14 in dashed lines in FIGS. 1 and 2, which form part of the frame and extend longitudinally of a tube bundle puller. The load-bearing rollers 10 are able to roll along the tops 15 of the beams 14 for movement of the carriage longitudinally thereof, such movement being guided by the guide rollers 13 engaging the inner sides 16 of the upper flanges of the I-beams 14. The arrangement is such that blocks 17, provided on the beams 14 for the purpose of facilitating pulling of a tube bundle from its shell, do not obstruct the movement of the carriage.

A pivot axle 18 extends in the longitudinal direction, generally between the rollers 10, through and between the transverse members 3, being retained in position by pins 19 which extend through bores in the axle 18 on the sides of the members 3 remote from one another. A first pair of links 20, spaced apart parallel to one another and rigidly secured together by means of a member 21 extending therebetween, and a second pair of links 22, spaced apart parallel to one another and rigidly secured together by means of a member 23 extending therebetween, are pivotally arranged on the axle 18 which passes through a bore provided through each of the links 20 and 22.

Figure 3:
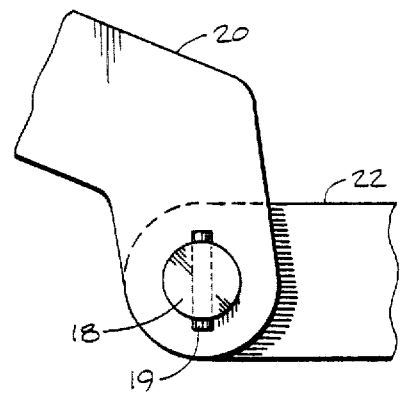
FIG. 3 is an illustration of parts of the carriage, seen in the direction of an arrow III in FIG. 2.

The arrangement of the links is best illustrated in FIG. 3, which merely shows the axle 18, one of the pins 19, and parts of the links 20 and 22. For the sake of clarity, FIG. 3 does not show any other parts of the carriage, including a member 3 which is disposed between the pin 19 and the link 20. As can be seen in FIG. 3, the links 20 are cranked so as to extend transversely outwardly through the recess formed between the legs of the U-shaped end member 4.

The ends of the links 20 remote from the axle 18 have circular holes 24 in which are received circular projections 25 of a member 26 which is thereby pivotally mounted between the links 20. A member 27 is similarly pivotally mounted between the links 22 at the ends thereof remote from the axle 18 by circular projections 28 of the member 27 being received in circular holes in the links 22, the position of which in the region of the member 27 is indicated in FIG. 1 by a chain line 29.

An elongate threaded bolt 30 having a head 31 extends through a correspondingly threaded central bore in the member 26. At its end remote from the head 31, the bolt 30 has a non-threaded portion of reduced diameter which extends through a first washer 32, which abuts against the shoulder formed on the bolt 30 between the threaded and non-threaded portions thereof, through a non-threaded central bore in the member 27, and through a second washer 33 which is secured in place by a nut 34 which is received on a final threaded part 35 of the bolt 30 and is itself held secure by a pin 36 which passes through holes provided in the nut 34 and the part 35 of the bolt 30. The members 26 and 27 have upper part-spherical or otherwise curved surfaces 37 and 38 respectively.

It will thus be seen that the member 27 constitutes a captive nut on the bolt 30, whereas the member 26 constitutes a travelling nut on the bolt 30. Consequently, upon rotation of the bolt 30 by means of its head 31 (which may be constituted by a nut secured rigidly to the bolt 30) the member 26 moves towards or away from the member 27, depending on the direction of rotation. In consequence, the members 26 and 27 pivot with respect to the links 20 and 22 respectively, and the links 20 and 22 are themselves pivotally moved relative to one another about the pivot axle 18 so that the angle at the pivot axle 18 between the links 20 and 22 changes. Consequently also the heights of the surfaces 37 and 38, which constitute support surfaces of the carriage, change relative to the carriage frame and hence relative to the tube bundle puller on which the carriage is used.

In use, when a tube bundle has been pulled by a tube bundle puller a short distance out of its shell, the carriage is positioned on the tube bundle puller frame, with its rollers 10 and 13 engaging the frame beams 14, under the tube sheet and the bolts 30 are rotated by means of the heads 31 to raise the support surfaces 37 and 38 so that they come into contact with the tube sheet and lift it slightly so that the carriage is carrying the weight of the tube bundle. The links 20 and 22 pivot about the axle 18 during the rotation of the bolts 30 so that the support surfaces achieve the desired height whilst also conforming to the diameter of the particular tube sheet.

The tube bundle is then pulled further out of its shell, the carriage supporting the tube rolling along the tube bundle puller frame and being guided by the guide rollers 13. Additional carriages are installed, as necessary to support the tube bundle, beneath the baffles of the tube bundle in the same manner as described above.

FIG. 1 also illustrates in chain lines a modification of the carriage described above, in which instead of the surfaces 37 and 38 directly acting as support surfaces these surfaces support a plate 39. The two plates 39, one on each side of the carriage, thus constitute a V shape in which the tube bundle to be supported is received. In this case the surfaces 37 and 38 need not be curved as described above. The plate 39 is rigidly secured to the surface 38 of the member 27 for example by welding, but is not fixed to the member 26, which is consequently able to move relative to the plate 39, with its surface 37 supporting the plate 39, on rotation of the bolt 30. Thus the plates 39 are adjustable in angle, pivoting about the axle 18, and position to support tube bundles of varying size at the proper height.

Whilst no particular materials have been specified for the various parts of the carriage described above, it should be appreciated that any materials, such as steel, of appropriate size and strength to withstand the loads imposed upon the carriage in use may be used.

Various modifications may be made to the above-described carriage without departing from the scope of the invention as defined in the claims. In particular, and not by way of limitation, it is observed here that different arrangements of the frame and rollers can be provided, and at least the guide rollers 13 could be replaced by fixed guide members which are slidable with respect to the beams 14. In addition, instead of or in addition to the bolt 30 engaging a threaded bore in the member 26 it could engage a threaded bore in the member 27 to provide the relative pivotal movement of the links 20 and 22 on rotation of the bolt.

Furthermore, although as described above the member 27 is coupled to the pivot axle 18 via the second pair of links 22, this need not necessarily be the case. Instead, with appropriate modification of the frame, the member 27 could be pivotally connected directly to the frame, the links 22 being dispensed with. In this case the member 27 would be fixed in position relative to the frame, although being pivotal with respect thereto, and only the surfaces 37 on the members 26 would provide support for a tube bundle. Again in this case the support plates 39 can optionally be provided as already described.

We claim:

1. A carriage for supporting a tube bundle on a tube bundle puller, comprising:
    a frame,
    means for permitting said frame to move in a longitudinal direction along a tube bundle puller; and
    a pair of support means provided one on each of two sides of the frame, each support means comprising:
    a pivot carried by the frame and extending in said longitudinal direction;
    an elongate rotatable threaded member and a first support member and a second member thereon;
    a first link member extending between and pivotally connected to each of said pivot and said first support member; and
    means pivotally coupling said second member to said frame;
    at least one of said first support member and said second member engaging said threaded member so that rotation of said threaded member causes movement of said first support member towards or away from said second member with consequent pivotal movement of said first link member relative to said second member about said pivot; and
    wherein for each of said support means said second member constitutes a second support member and said means pivotally coupling said second member to said frame comprises a second link member extending between and pivotally connected to each of said pivot and said second support member.

2. A carriage as claimed in claim 1 wherein each of said first and second link members of each support means comprises two links spaced apart from one another and means rigidly securing said links together with the respective support member therebetween, each link being pivotally connected at one end to said pivot and at the other end to the respective support member.

3. A carriage as claimed in claim 2 wherein for each of said support means said threaded member comprises an elongate threaded bolt, one of said first and second support members is threaded to engage a thread of said bolt, and the bolt is freely rotatable within a bore provided in the other of said first and second support members.

4. A carriage as claimed in claim 3 wherein for each of said support means the bolt is provided with means at one end for facilitating rotation thereof and said other of said first and second support members is provided at an opposite end of the bolt.

5. A carriage as claimed in claim 1, 2, or 4 wherein each of said first and second support members of each of said support means has a curved support surface which is uppermost in use of the carriage.

6. A carriage as claimed in claim 1, 2, or 4 wherein each of said support means further comprises a support plate rigidly secured to one of said first and second support members and in contact with the other of said first and second support members to be slidable with respect thereto and supported thereby, said support plate extending parallel to said threaded member and above said threaded member in use of the carriage.

7. A carriage as claimed in claim 1, 2, or 4 wherein said means for permitting said frame to move in said longitudinal direction comprises, on each side of the frame, two load-bearing rollers arranged for rolling in said longitudinal direction and having axes which are horizontal in use of the carriage and are spaced apart in said longitudinal direction.

8. A carriage as claimed in claim 1, 2, or 4, wherein said means for permitting said frame to move in said longitudinal direction comprises, on each side of the frame, two load-bearing rollers arranged for rolling in said longitudinal direction and having axes which are horizontal in use of the carriage and are spaced apart in said longitudinal direction, and two guide rollers arranged for rolling in said longitudinal direction and having axes which are substantially vertical in use of the carriage and are spaced apart in said longitudinal direction.

* * * * *